US011112420B2

United States Patent
Hu et al.

(10) Patent No.: US 11,112,420 B2
(45) Date of Patent: Sep. 7, 2021

(54) DEVICE FOR SEPARATING REAGENT FROM REACTOR

(71) Applicant: SHENZHEN YHLO BIOTECH CO., LTD., Shenzhen (CN)

(72) Inventors: Kunhui Hu, Shenzhen (CN); Yujin Xiao, Shenzhen (CN); Fuxing Zhang, Shenzhen (CN); Benqing Wu, Shenzhen (CN); Yongbo Song, Shenzhen (CN)

(73) Assignee: SHENZHEN YHLO BIOTECH CO., LTD., Shenzhen (CN)

( * ) Notice: Subject to any disclaimer, the term of this patent is extended or adjusted under 35 U.S.C. 154(b) by 282 days.

(21) Appl. No.: 16/314,391

(22) PCT Filed: Jun. 30, 2016

(86) PCT No.: PCT/CN2016/087850
§ 371 (c)(1),
(2) Date: Dec. 29, 2018

(87) PCT Pub. No.: WO2018/000306
PCT Pub. Date: Jan. 4, 2018

(65) Prior Publication Data
US 2019/0154714 A1     May 23, 2019

(51) Int. Cl.
*G01N 35/04* (2006.01)
*B01L 9/02* (2006.01)
(Continued)

(52) U.S. Cl.
CPC .............. *G01N 35/04* (2013.01); *B01L 1/50* (2013.01); *B01L 9/02* (2013.01); *B01L 9/06* (2013.01);
(Continued)

(58) Field of Classification Search
CPC ......... G01N 35/04; G01N 2035/00475; B01L 1/50; B01L 9/02; B01L 9/06; B01L 99/00;
(Continued)

(56) References Cited

U.S. PATENT DOCUMENTS 4,406,547 A * 9/1983 Aihara ................. G01N 21/253
                                                 356/414
5,441,891 A * 8/1995 Burkovich ............. G01N 35/04
                                                  422/63
(Continued)

FOREIGN PATENT DOCUMENTS

CN        101306403 A     11/2008
CN        102419375 A      4/2012
(Continued)

OTHER PUBLICATIONS

International Search Report dated Apr. 10, 2017 in the corresponding international application (application No. PCT/CN2016/087850).

*Primary Examiner* — Samuel P Siefke
*Assistant Examiner* — Tingchen Shi
(74) *Attorney, Agent, or Firm* — Kilpatrick Townsend & Stockton LLP

(57) ABSTRACT

A device for separating a reagent from a reactor includes a collecting means, provided with a liquid receiving port and a solid receiving port, a holding component disposed above the collecting means and used for placing the reactor, and a rotating mechanism for driving the holding component to rotate. The liquid receiving port and the solid receiving port are arranged at different positions in the circumferential direction of rotation of the holding component, when the holding component passes over the liquid receiving port, reagent in the reactor falls into the liquid receiving port, when the rotating mechanism continues rotating in the original direction until the holding component passes over
(Continued)

the solid receiving port, the reactor falls into the solid receiving port from the holding component.

7 Claims, 3 Drawing Sheets

(51) Int. Cl.
- *B01L 9/06* (2006.01)
- *B09B 3/00* (2006.01)
- *B01L 1/00* (2006.01)
- *B01L 99/00* (2010.01)
- *G01N 35/00* (2006.01)

(52) U.S. Cl.
CPC ............... *B01L 99/00* (2013.01); *B09B 3/00* (2013.01); *B01L 2200/141* (2013.01); *G01N 2035/00475* (2013.01); *G01N 2035/0408* (2013.01); *G01N 2035/0417* (2013.01); *G01N 2035/0437* (2013.01); *G01N 2035/0443* (2013.01); *G01N 2035/0444* (2013.01); *G01N 2035/0465* (2013.01)

(58) Field of Classification Search
CPC ... B01L 9/56; B01L 13/00; B01L 3/02; B09B 3/00

See application file for complete search history.

(56) References Cited

U.S. PATENT DOCUMENTS

| | | | | |
|---|---|---|---|---|
| 5,794,671 A | | 8/1998 | Smith | |
| 5,849,247 A | * | 12/1998 | Uzan | G01N 35/026 422/65 |
| 7,402,281 B2 | * | 7/2008 | Huynh-Ba | G01N 35/025 422/547 |

FOREIGN PATENT DOCUMENTS

| | | | | |
|---|---|---|---|---|
| CN | 102728428 A | * | 10/2012 | |
| CN | 102728428 A | | 10/2012 | |
| CN | 203078770 U | | 7/2013 | |
| CN | 203316139 U | | 12/2013 | |
| CN | 204028090 U | | 12/2014 | |
| CN | 204999596 U | | 1/2016 | |
| CN | 105327920 A | | 2/2016 | |
| CN | 205217560 U | * | 5/2016 | |
| CN | 205217560 U | | 5/2016 | |
| CN | 106180120 A | | 12/2016 | |
| JP | S59151062 A | * | 8/1984 | |
| JP | 2002136938 A | * | 5/2002 | |
| JP | 2002136938 A | | 5/2002 | |

\* cited by examiner

DEVICE FOR SEPARATING REAGENT FROM REACTOR

CROSS-REFERENCE TO RELATED APPLICATIONS

This application is a U.S. National Stage of International Application No. PCT/CN2016/087850, filed on Jun. 30, 2016, which is hereby incorporated by reference in its entirety.

FIELD

The present disclosure relates to sorting and disposing equipment for a liquid and a solid and, in particular, to a device for separating a reagent from a reactor.

BACKGROUND

In the field of in vitro diagnostic (IVD) detection, such as detection of a specific antigen or antibody in a sample by an immunoanalyzer, a reaction liquid is first added to a reaction container for reaction. When a waste is disposed after completion of a test, the reaction container, usually together with the contained reaction liquid, is discarded to a dustbin. During the disposal, an operator may pick up the contained reaction liquid or may spill the reaction liquid into an analyzer to cause contamination. Therefore, it is necessary to separate the reaction container from the reaction liquid to achieve the purpose of sorting and disposing the waste.

Generally, the liquid in the reaction container is sucked out by the sorting and disposing device with a liquid aspirating needle, and then the liquid and the reaction container are discarded and disposed separately. However, such a device is complicated in structure and high in cost.

SUMMARY

The present application discloses a device for separating a reagent from a reactor to solve one or more of the problems involved in the background.

A device for separating a reagent from a reactor, comprises: a collecting means, provided with a liquid receiving port and a solid receiving port; a holding component disposed above the collecting means and used for placement of the reactor; and a rotating mechanism for driving the holding component to rotate, wherein the liquid receiving port and the solid receiving port are arranged at different positions in the circumferential direction of rotation of the holding component; when the holding component passes over the liquid receiving port, the reagent in the reactor falls into the liquid receiving port; when the rotating mechanism continues rotating in an original direction until the holding component passes over the solid receiving port, the reactor is detached from the holding component and falls into the solid receiving port.

Details of one or more embodiments of the disclosure are set forth in the accompanying drawings and description below. Other features, objects, and advantages of the present disclosure will be apparent from the description, accompanying drawings, and claims.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE INVENTION

In order to facilitate the understanding of the present disclosure, the present disclosure will be described more fully hereinafter with reference to the accompanying drawings. Embodiments of the disclosure are given in the accompanying drawings. However, the disclosure can be embodied in many different forms and is not limited to the embodiments set forth herein. Rather, these embodiments are provided so that this disclosure will be more thoroughly and completely understood.

It should be noted that when an element is referred to as being "fixed" to another element, it may be directly on the other element or there may also be an intermediate element. When an element is considered to be "connected" to another element, it may be directly connected to the other element or there may also be an intermediate element. The terms "inside," "outside," "left," "right" and similar expressions used herein are for illustrative purposes only and are not meant to be the only embodiments.

EXAMPLE 1

Figure 1:
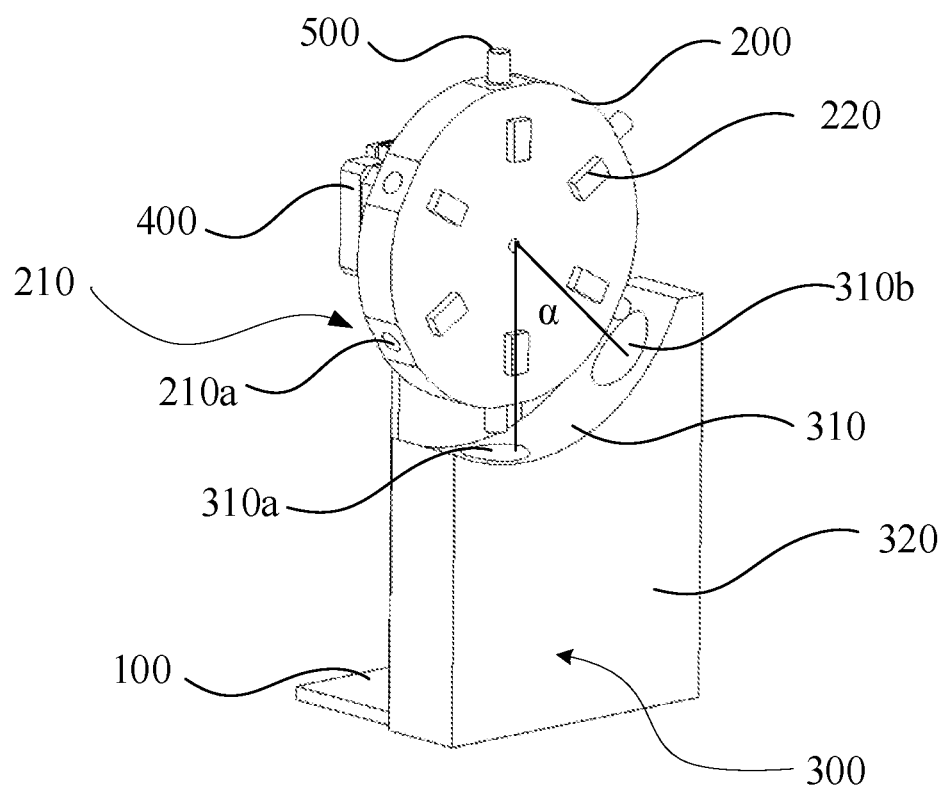
FIG. 1 is a schematic structural diagram of a sorting and disposing device according to example 1.
Figure 2A:
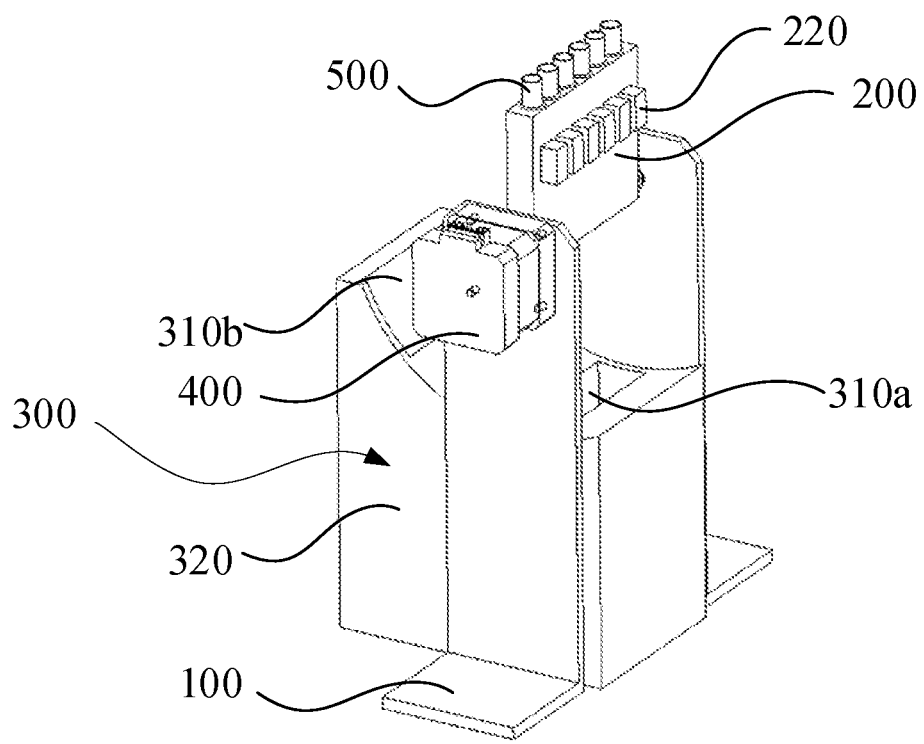
FIG. 2a is a schematic structural diagram of a sorting and disposing device according to example 2.
Figure 2B:
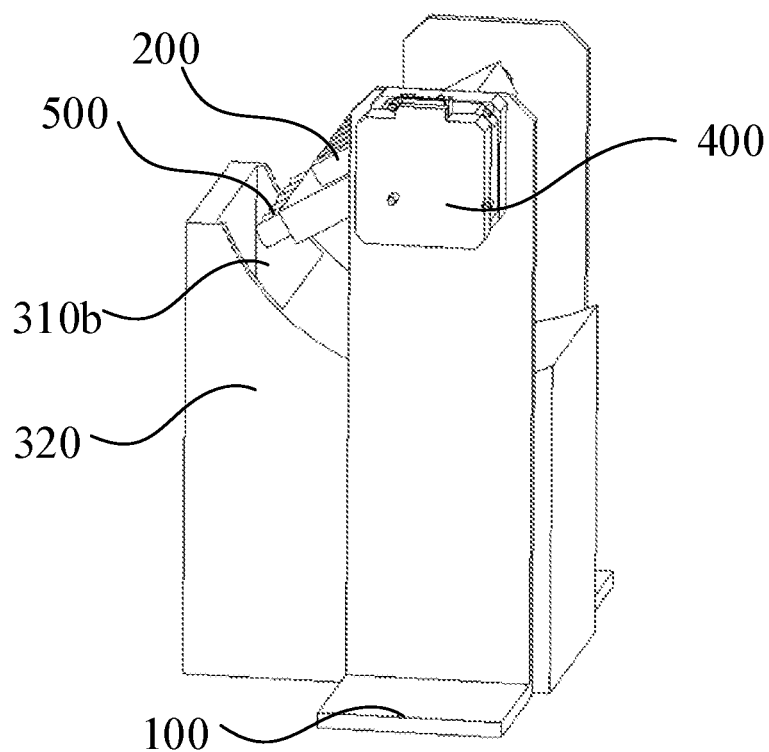
FIG. 2b is a schematic view showing the rotating mechanism of example 2 rotated at an angle.
Figure 3:
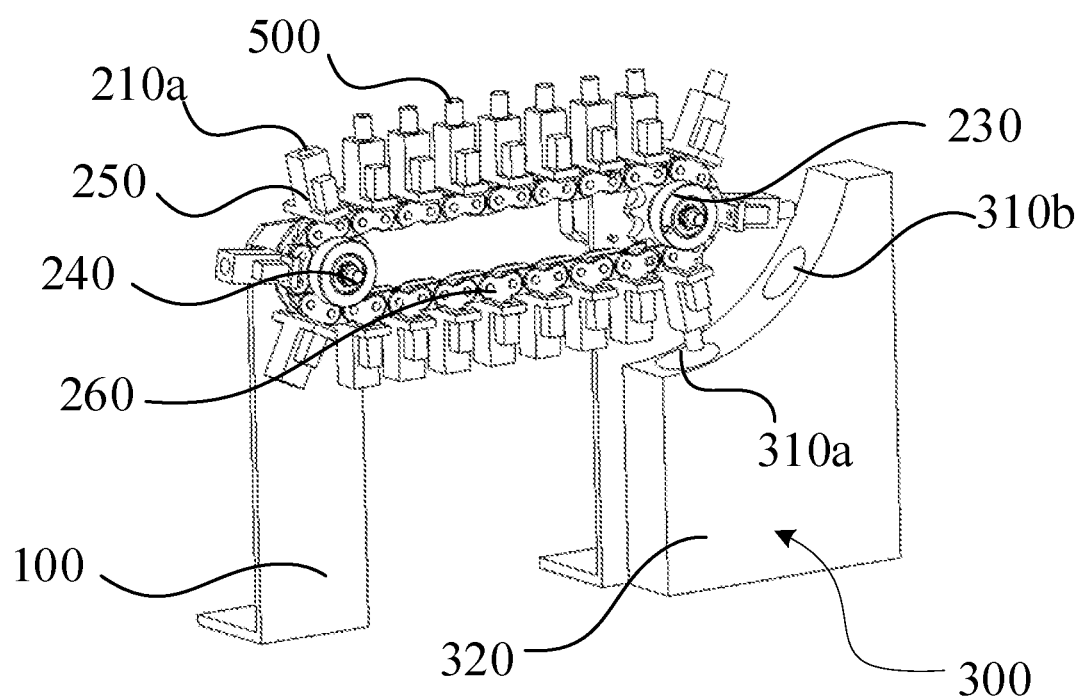
FIG. 3 is a schematic structural diagram of a sorting and disposing device according to example 3.

Referring to FIGS. 1 to 3 together, a reagent-reactor separation device according to a first embodiment includes a support 100, a collecting means 300, a driver 400, and a rotating mechanism 200. The support 100 is located aside the collecting means 300, and the driver 400 is mounted on the support 100. The driver 400 has an output shaft connected to the rotating mechanism 200, and drives the rotating mechanism 200 to rotate. The rotating mechanism 200 is located just right above the collecting means 300, and a plurality of holding components 210 are provided on the rotating mechanism 200, and are also located above the collecting means 300.

A reactor 500 containing a reagent is placed in the holding component 210, and an upper portion of the reactor 500 is always in an open state. When the rotating mechanism 200 rotates, the reactor 500 containing the reagent is rotated along with the rotating mechanism 200 under a holding action of the holding component 210.

The collecting means 300 is provided with a liquid receiving port 310b and a solid receiving port 310a arranged at different positions in the circumferential direction of rotation of the holding component 210, in particular, the position of the liquid receiving port 310b on the collecting means 300 may be flat with or lower than the solid receiving port 310a as long as the holding component 210 first passes over the liquid receiving port 310b when the holding component 210 is rotated along with the rotating mechanism 200. In one embodiment, the liquid receiving port 310b is located at a higher position on the collection means 300 than the solid receiving port 310*a*. The holding component 210 is rotated along with the rotating mechanism 200, and when the holding component 210 passes over the liquid receiving port 310*b*, the reagent in the reactor 500 falls just into the liquid receiving port 310*b* under gravity due to an opening of the reactor 500 in an obliquely downward state; the rotating mechanism 200 continues rotating forward in the original direction; when the reactor 500 containing no reagent therein hold by the holding component 210 passes over the solid receiving port 310*a*, a holding force applied on the reactor 500 by the holding component 210 is not sufficient to overcome the gravity of the reactor 500 itself, and the reactor 500 falls under gravity into the solid receiving port 310*a*. By separately collecting the reactor 500 and the reagent in the solid receiving port 310*a* and the liquid receiving port 310*b*, respectively, the purpose of sorting and disposing the reagent and the reactor can be achieved. The device has a simple structure and convenient operation, and the manufacturing and maintenance costs of the device are greatly reduced.

In particular, the holding component 210 may be an accommodating hole 210*a* disposed on the rotating mechanism 200. The accommodating hole 210*a* is adapted to a shape of a bottom of the reactor 500, and has a reasonable depth. When the reactor 500 is a cylindrical test tube, the accommodating hole 210*a* is a circular hole. The reactor 500 may be detached under gravity from the accommodating hole 210*a* into the solid receiving port 310*a* only when the opening of the reactor 500 faces downward. Since there is a centrifugal force acting on the reactor 500 during the rotation, to prevent the reactor 500 from being thrown out untimely from the accommodating hole 210*a*, (that is, the reactor 500 may be detached from the accommodating hole 210*a* before being rotated above the solid receiving port 310*a*), anti-slip layer is thus provided at an inner wall of the accommodating hole 210*a* to appropriately increase a friction force between the reactor 500 and the accommodating hole 210*a*, so that the reactor 500 will not be detached from the accommodating hole 210*a* untimely. However, the friction force should not be too large for the reactor 500 to be smoothly detached from the accommodating hole 210*a* when it is rotated over the solid receiving port 310*a*. Certainly, there are other alternatives for the holding component 210. For example, the holding component 210 is a clamp. When the reactor 500 is rotated over the solid receiving port 310*a*, a clamping force of the clamp acting on the reactor 500 is insufficient to overcome the gravity of the reactor 500, and the reactor 500 may also fall into the solid receiving port 310*a*. The holding component 210 may be an adhering member, and the reactor 500 is detached and falls into the solid receiving port 310*a* by overcoming an adhesive force from the adhering member.

Referring to FIG. 1, the driver 400 is a motor, the driver 400 is mounted on the support 100 at a side of the collecting means 300, the rotating mechanism 200 is a circular turntable, and six accommodating holes 210*a* are uniformly distributed along an outer circumference of the circular turntable. The reactor 500 is a cylindrical test tube, and is inserted into the accommodating hole 210*a*. When the reactor 500 has a small weight, the accommodating hole 210*a* should not be too deep in order to enable the reactor 500 easily to be detached from the accommodating hole 210*a* and to fall into the solid receiving port 310*a*; conversely, when the reactor 500 has a relative large weight, the accommodating hole 210*a* may has an appropriately increased depth.

The collecting means 300 comprises a collecting table 320, and a circular arc-shaped surface 310 is disposed at a top of the collecting table 320. The circular arc-shaped surface 310 corresponds to the outer circumference of the circular turntable located right above the circular arc-shaped surface 310. Both the liquid receiving port 310*b* and the solid receiving port 310*a* are disposed in the circular arc-shaped surface 310. In one embodiment, the solid receiving port 310*a* is located just at a bottom of the circular arc-shaped surface 310, a center line of the solid receiving port 310*a* passes right through a center of the circular turntable, and the liquid receiving port 310*b* is close to a top of the circular arc-shaped surface 310.

During operation, the reactor 500 containing the reagent is placed in the accommodating hole 210*a* with the opening of the reactor 500 in a vertically upward state. The circular turntable is rotated clockwise by the driver 400, the rotation angle does not exceed 90 degrees, the opening of the reactor 500 is in an obliquely upward state, the reagent would not flow out from the opening of the reactor 500, and the reactor 500 is also held in the accommodating hole 210*a*. While the circular turntable is rotated more than 90 degrees, the opening of the reactor 500 is in an obliquely downward state; at this time, the liquid receiving port 310*b* is just located below the reactor 500, the reagent flows out from the opening of the reactor 500 into the liquid receiving port 310*b*, and the reactor 500 is still hold in the accommodating hole 210*a* by the friction force and rotated with the circular turntable.

In order to ensure sufficient time for the reagent to flow completely into the liquid receiving port 310*b*, the liquid receiving port 310*b* has a larger opening size than the accommodating hole 210*a*. That is, there is sufficient time for reagent to flow completely into the liquid receiving port 310*b* during the period for a center line of the accommodating hole 210*a* from entering into to leaving from the liquid receiving port 310*b* along the rotation direction of the circular turntable. Therefore, a range of the opening size of the liquid receiving port 310*b* can be determined based on an amount of the reagent. Certainly, it is also possible to control a speed at which the circular turntable rotates, and when the reactor 500 is located above the liquid receiving port 310*b*, the speed of the circular turntable can be appropriately slowed down so that the reagent completely flows into the liquid receiving port 310*b*.

When the circular turntable is rotated close to 180 degrees, the opening of the reactor 500 is in a state close to vertically downward. At this time, gravity will overcome the friction force between the reactor 500 and the accommodating hole 210*a*, and the reactor 500 falls into the solid receiving port 310*a*, so that separation of the reactor 500 from the reagent can be completed for subsequent sorting and disposal of the reactor and the reagent.

The sorting and disposing device may further realize pipeline circulation operation. The reactor 500 containing the reagent is placed, by a robot arm, into the opening of the accommodating hole 210*a* whenever in vertically upward, and separation of the reagent from the reactor 500 is automatically achieved in the circular turntable during rotation.

When a magnetic substance is contained in the reagent, a magnetic member 220, such as a secondary magnet, may be mounted at a portion of an outer wall of the circular turntable corresponding to the accommodating hole 210*a*. The magnetic substance will be adsorbed, under the action of the magnetic member 220, on an inner surface of the reactor 500 without entering into the liquid receiving port 310*b* along with the reagent, and the magnetic substance will eventually fall into the solid receiving port 310a along with the reactor 500. Certainly, the magnetic member 220 is not mounted on the circular turntable when no magnetic substance is contained in the reagent. The installation of the magnetic member 220 depends on whether or not a magnetic substance is present in the reagent.

Specifically, the solid receiving port 310a should be within a reasonable distance from the liquid receiving port 310b to ensure that the reactor 500 may accurately fall into the solid receiving port 310a neither in advance nor delay after reagent separation. An angle between the center line of the solid receiving port 310a and a center line of the liquid receiving port 310b is α, wherein 10°≤α≤80°. In this embodiment, α has a value of 60°.

EXAMPLE 2

Referring to FIGS. 2a and 2b, specifically, the rotating mechanism 200 is a rectangular rotating block, and the accommodating holes 210a are spaced apart at a top of the rectangular rotating block and are arranged in a straight line. The accommodating holes 210a may be arranged in one or more rows. In consideration of the rectangular rotary block having a long length, supports 100 are provided on both sides of the collecting table 320. The rectangular rotating block can swing, or can realize a 360-degree rotation. During operation, the reactor 500 in all of the accommodating holes 210a falls almost simultaneously into the solid receiving port 310a, and therefore the solid receiving port 310a is in an elongated shape. Similarly, the reagent in all reactors 500 flows almost simultaneously into the liquid receiving port 310b, and the liquid receiving port 310b is also in an elongated shape. Other parts which do not mentioned in this example are referred to example 1.

EXAMPLE 3

Referring to FIG. 3, specifically, the rotating mechanism 200 is a chain transmission mechanism. Certainly, the rotating mechanism 200 may be a belt transmission mechanism. The chain transmission mechanism includes a driving sprocket 230, a driven sprocket 240, a chain 260, and a reactor holder 250. The reactor holder 250 is spaced apart on the chain 260 and provided with the accommodating holes 210a. The collecting table 320, at one side, is provided with two supports 100, in which one support 100 is provided with the driving sprocket 230, and the other support 100 is provided with the driven sprocket 240. The driving sprocket 230 is connected to the output shaft of the driver 400, and the driver 400 drives the chain 260 to rotate clockwise. This device also enables continuous pipeline operation. The operating principle and other parts of this embodiment are referred to example 1 and example 2.

Various technical features of the embodiments described above may be arbitrarily combined, and in order to simplify the description, not all possible combinations of the various technical features in the above embodiments are described, however, as long as the technical features have no collision with each other, they should be considered as the scope of this specification.

The embodiments described above only illustrate several embodiments of the present disclosure, the description of which is more specific and detailed, but is not therefore to be understood as limiting the scope of the disclosure. It should be noted that for those of ordinary skill in the art, various variations and modifications may also be made without departing from the concept of the disclosure, and such variations and modifications are within the scope of the present disclosure. Therefore, the scope of protection of this disclosure patent shall be subject to the appended claims.

The invention claimed is:

1. A device for separating a reagent from a reactor, comprising:
    a collecting means, provided with a liquid receiving port and a solid receiving port;
    a holding component disposed above the collecting means and used for placement of the reactor, wherein the holding component has an accommodating hole for holding the reactor; and
    a rotating mechanism for driving the holding component to rotate,
    wherein the liquid receiving port and the solid receiving port are arranged at different positions in the circumferential direction of rotation of the holding component; when the holding component passes over the liquid receiving port, the reagent in the reactor falls into the liquid receiving port; when the rotating mechanism continues rotating in an original direction until the holding component passes over the solid receiving port, the accommodating hole is directed vertically downward and the reactor falls vertically into the solid receiving port from the holding component;
    wherein the collecting means comprises a collecting table having a circular arc-shaped surface disposed at a top of the collecting table, the circular arc-shaped surface corresponds to the rotating mechanism, both the liquid receiving port and the solid receiving port are provided on the circular arc-shaped surface, and the solid receiving port is located at a bottom of the circular arc-shaped surface;
    wherein an angle between a center line of the solid receiving port and a center line of the liquid receiving port is α, wherein 10°≤α≤80°.

2. The device according to claim 1, wherein the rotating mechanism is a circular turntable and a plurality of the holding components are uniformly distributed along an outer circumference of the circular turntable.

3. The device according to claim 1, wherein the rotating mechanism is a rectangular rotating block and the holding components are spaced apart at a top of the rectangular rotating block.

4. The device according to claim 1, wherein the rotating mechanism is a chain transmission mechanism comprising a driving sprocket, a driven sprocket, a chain and a reactor holder spaced apart on the chain, and the holding component is provided on the reactor holder.

5. The device according to claim 1, wherein the holding component is an accommodating hole adapted to a shape of a bottom of the reactor.

6. The device according to claim 5, wherein an anti-slip layer is provided at an inner wall of the accommodating hole.

7. The device according to claim 5, wherein a magnetic member is mounted on a portion of an outer surface of the rotating mechanism corresponding to the accommodating hole.

* * * * *